Jan. 22, 1957 — R. E. FELLMETH — 2,778,273
REARVIEW MIRROR
Filed March 3, 1953
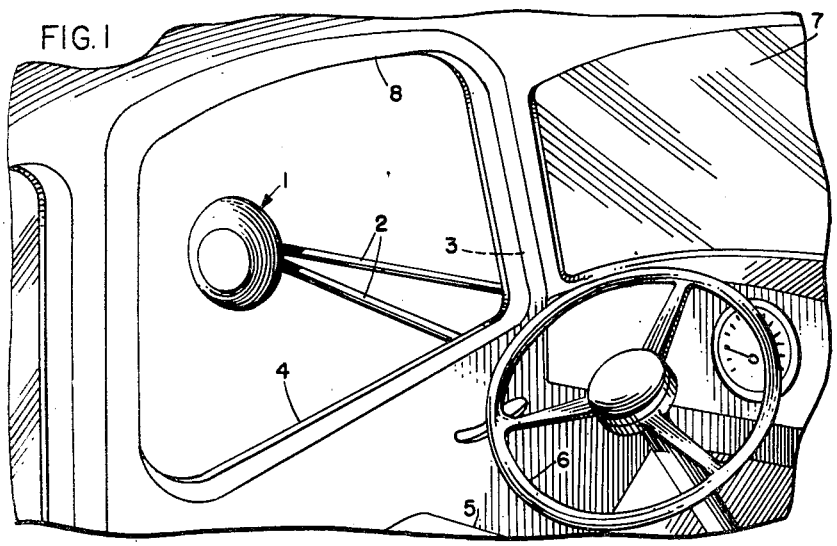
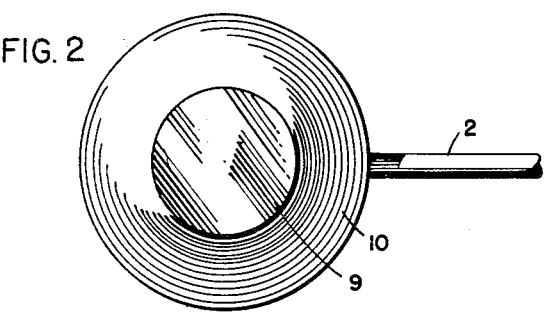
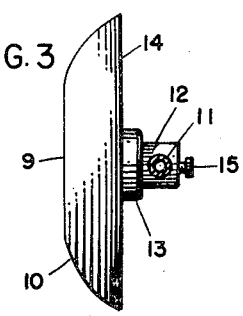
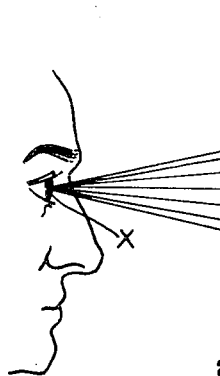
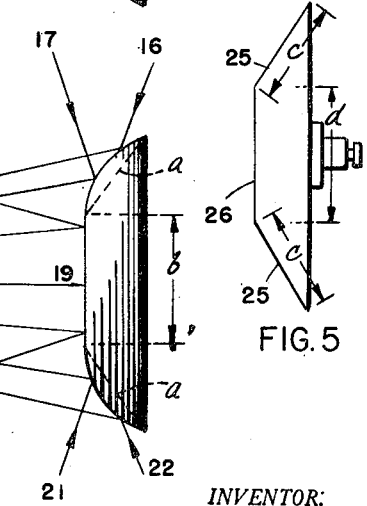
INVENTOR:
ROBERT E. FELLMETH
BY
Spencer, Johnston, Cook & Root
ATT'YS

United States Patent Office 2,778,273
Patented Jan. 22, 1957

2,778,273

REARVIEW MIRROR

Robert E. Fellmeth, Lake Geneva, Wis.

Application March 3, 1953, Serial No. 340,016

2 Claims. (Cl. 88—87)

This invention relates to a new and improved rear view mirror and particularly to a rear view mirror for use on automotive vehicles wherein the mirror has a flat intermediate portion with a convex edge portion.

My improved mirror is designed to facilitate viewing a wide scope of area adjacent to and rearwardly of an automotive vehicle. Rear view mirrors as found today are characterized either by a flat surface that reflects an object located to the rear of an automotive vehicle in substantially straight line paths of reflection, or by a slightly concave surface, which has the disadvantage of making objects appear smaller and farther away than they are in reality. Mirrors having a flat surface are unsatisfactory because of the "blind spot" encountered by operators of automotive vehicles. The blind spot is that area between the rear inside of the automotive vehicle and a point adjacent the rear outside portion of the automotive vehicle that may not be seen from the operator's point of vantage even when using auxiliary vision techniques or devices such as an inside rear view mirror centered upon the rear window or windows of the automotive vehicle and the conventional rear view mirror mounted outside the vehicle proximate to the automotive vehicle driver.

The rear view mirror herein disclosed is designed to be mounted outside the automotive vehicle and to the left of the driver thereof and is comprised of a generally flat center portion and a convex, curved peripheral portion surrounding the flat portion. A mirror of this construction enables the driver of an automotive vehicle to view a large area reflected by both portions of the mirror. By glancing at the mirror, objects in the far distance rearwardly are reflected in the medial flat portion and objects proximate to the side, bottom and rear of the vehicle are reflected in the curved and convex peripheral portion of the mirror.

The shape of the mirror surface may be broadly described as a convex section of a sphere having parallel flat surfaces. One surface of the sphere section comprises the back portion of the mirror used in mounting the mirror and extends to one convex edge. The other surface comprises the reflecting surface and includes a flat medial portion surrounded by the convex edges of the sphere section.

The mirror is of particular advantage to operators of trucks and automotive tractors. Vehicles of this type are so constructed that the operator is positioned at an elevated point above the street or pavement level making it difficult to observe objects and conditions immediately proximate to the wheels of the truck, tractor or the trailer or van attached to the tractor. A mirror of the variety encompassed by this invention is particularly useful when mounted upon commercial trucks and tractors with trailers coupled thereto wherein there is a difference in the width of the truck cabin or tractor with respect to the body portion of the truck or the trailer hitched to the truck. Frequently such body portion or trailer is wider than the cabin or tractor and extends outwardly on either side of the cabin or the tractor. Consequently the vehicle operator has relatively little visibility of objects that are rearwardly at a distance from the vehicle or proximate to the rearward and lower portions of the truck body or trailer. The mirror enables the operator of such vehicles to observe objects and conditions immediately adjacent the rear, the lower and under portions of the truck body, cabin, trailer, van or tractor as the case may be. Of particular significance is the fact that the lower portions of the convex curved area of the mirror reflect objects that lie within a path of the rear wheels of the automotive vehicle, including auxiliary wheels that may be positioned between the extreme rear wheels and extreme front wheels of the vehicle. Frequently a large truck will have a set of four wheels rearwardly, a similar set to the front of the vehicle and two or more wheels intermediate the front and rear sets. In the case of a tractor and trailer combination, the tractor portion of the combination will be comprised of front and rear wheels and the trailer portion may have front wheels as well as rear wheels. In addition there is some enlargement of the objects reflected in such curved portions due to the distortion of objects reflected therein enhancing visibility.

It is, therefore, the primary object of the present invention to provide an improved rear view mirror enabling the operator of an automotive vehicle to observe a greater scope of objects and conditions rearwardly of the automotive vehicle.

Another object of the present invention is the provision of a new and novel rear view mirror having a flat surface and a curved outer edge portion extending outwardly from the plane of the flat portion enabling the operator of an automotive vehicle to see a true reflection of objects and conditions at a distance rearwardly of the vehicle as well as an enlarged reflection of objects and conditions proximate to and beneath the vehicle.

A still further object of the invention is the provision of a rear view mirror with a flat center portion and an edge portion angularly disposed away from the flat portion enabling the operator of a vehicle to encompass a greater scope of the field adjacent to, to the rear of, and at a distance rearwardly of the vehicle.

Another object of the invention is the provision of a rear view mirror having a flat portion and a convexly curved perimeter surrounding the flat portion for use on the driver's side of a vehicle such as a truck enhancing the visibility of the truck operator with respect to the under portions of the truck as well as areas proximate to and at a distance from the truck.

Other objects and advantages of the invention will become apparent upon reading the following description taken in conjunction with the accompanying drawing in which:

Fig. 1 is a perspective view of a portion of the interior of a vehicle such as a truck with the side or rear view mirror comprising the invention mounted in operative position upon the side of the vehicle adjacent to and to the left of the operator's point of vantage;

Fig. 2 is a front elevational view of the mirror;

Fig. 3 is a side elevational view thereof together with bracket means for mounting the mirror;

Fig. 4 is a diagrammatic representation of the reflective characteristics of the mirror as met by an observer; and Fig. 5 is an elevational view of a modified form of the invention.

The mirror comprising this invention is indicated in Fig. 1 by the numeral 1 and is shown therein as being mounted on supporting rods 2 upon a portion 3 of the body frame adjacent the left-hand front door or operator's door 4. The mirror is depicted as seen from the operator's vantage 5 behind the steering wheel 6, the windshield 7 and through the operator's window 8.

The mirror is comprised of a central portion 9 having a substantially flat surface and an outer portion 10 having a convexly curved surface surrounding the central portion 9. One of the mirror supporting rods 2 is secured at one end thereof to the portion 3 of the body frame and is slidably and rotatably received at its other end within the opening 11 in the bracket 12 journaled in the hub 13 which may be either integral with or fastened to the rear surface 14 of the mirror plate (Fig. 3). The mirror is securely positioned upon the rod 2 by means of set screw 15 threadedly received by an opening in the back portion of the bracket 12.

As a matter of practice it is found that the best form of construction of the mirror with respect to the proportions of the curved peripheral portion and the flat central portion has been to extend the curved portion so that the length of the cord of the arc is approximately one-half the diameter of the flat portion. The preferred form of the mirror is shown in Fig. 4. The distance $b$ represents the diameter of the flat portion 9. The reference $a$ represents the cord of the arc formed by the curved peripheral portion of the mirror, the value of which is substantially equal to one-half the diameter $b$. Consequently the overall width of the mirror is substantially twice the diameter $b$.

Fig. 4 embodies a diagrammatic representation of the sweep of vision reflected by the mirror. This sweep has been depicted by the seven image lines 16 through 22 simulating the directional path of objects at multiple and variant positions that are reflected by the mirror back to the human eye X. Such result would be had in the case of a vehicle operator seated at the vantage point 5 viewing the mirror 1 through the driver's window 4. Objects which are positioned upwardly or at one side of the mirror will be reflected by the curved peripheral portion of the mirror and such images may be seen as indicated by the image lines 16 and 17. Objects located in front of the mirror but at a plane lower than objects reflected by the image lines 16 and 17 are reflected as indicated by the image line at 18, the outer edge of the flat portion 9 of the mirror. An image of objects and conditions at a distance from the mirror and directly in line with the flat reflecting surface thereof are reflected from the center of the mirror along the image line 19. Objects at a distance from the mirror and below the center thereof are reflected at the lower edge of the flat portion 9 along the image line 20. Objects reflected along the image lines 21 and 22 from the lower portion of the curved periphery 10, are located immediately to the side, rear and under portions of the equipment upon which the mirror is used. Thus image lines 21 and 22 reflect objects and conditions proximate to the rear and intermediate the wheels of the automotive vehicle.

It is apparent that since the rear of the automotive vehicle as well as objects at a distance from the vehicle are reflected by the mirror and are readily seen from the vantage point 5 of the driver's eye X, the so-called "blind spot" prevalent in automobiles, for instance, is eliminated and the mirror device consequently eliminates a hazardous driving condition. It is also apparent that the wide scope of objects depicted by the image lines 16 through 20 is of particular significance to operators of heavy type automotive vehicles where vision of driving conditions rearwardly and proximate to the vehicle is poor owing to the construction of such vehicles.

In Fig. 5 a modified form of rear view mirror is shown wherein the peripheral portions 25 thereof are not curved but merely taper outwardly and are angularly disposed to the flat central portion 26. Such construction also encompasses a wide reflective scope of areas behind, proximate to and beneath the automotive vehicle or other equipment with which it is used. The suggested proportions as between the flat or beveled peripheral portion and the central medial portion is substantially similar to that outlined in the discussion of these proportions set forth with respect to Fig. 4. Thus, the dimension $c$, of peripheral portion 25 is preferably about one-half the dimension $d$ of the medial portion 26.

While the preferred form of the rear view mirror has been depicted and described as round so that there is a flat center portion 9 and a curved outer portion 10, it is readily apparent, however, that the shape of the center portion 9 may be changed and may be made oval, octagon, square, rectangular and the like. The outer edge portion 10 may then conform to the pattern as the central portion may dictate. In each case the portion comparable to 10 will taper away and lie at an angle from the outermost edge of the medial portion. Similarly, the tapered portion 25 may conform to the shape of the medial portion 26.

Although the mirror has been drawn to and discussed as suitable for use as a means for reflecting objects rearwardly of and beneath an automotive vehicle, it is apparent that the mirror has many other uses wherever it may be desirable to view rearward conditions without requiring the viewer to turn about. Many such situations are encountered, for instance, in industry where it is important to obtain a broad sweep of rearward objects without diverting attention from a situation forwardly of the viewer.

It is apparent that changes may be made in the form, construction and arrangement of parts from those disclosed herein without in any way departing from the spirit of the invention or sacrificing any of the attendant advantages thereof, provided, however, that such changes fall within the scope of the claims appended thereto.

The invention is hereby claimed as follows:

1. A rear view mirror for mounting upon the side of an automotive vehicle comprising a centrally disposed and substantially flat circular reflecting area, a spherical convex peripheral reflecting surface integral with and completely circumscribing said central area and extending rearwardly therefrom in continuously increasing diameters, and means for securing the mirror to the automotive vehicle at a position whereby the vehicle operator may view as reflections in said mirror objects directly behind the automotive vehicle, as well as objects in the areas around said mirror.

2. A rear view mirror for mounting upon the side of an automotive vehicle comprising a centrally disposed and substantially flat circular reflecting area, a spherical convex peripheral reflecting surface integral with and completely circumscribing said central area and extending rearwardly therefrom in continuously increasing diameters, and means for securing the mirror to the automotive vehicle at a position whereby the vehicel operator may view as reflections in said mirror objects directly behind the automotive vehicle, as well as objects in the areas around said mirror, the length of the cord of said convex peripheral surface being substantially equal to one-half the diameter of said circular area.

UNITED STATES PATENTS

References Cited in the file of this patent

| 1,643,420 | Porter | Sept. 27, 1927 |
| 1,814,667 | Cowdrey | July 14, 1931 |
| 1,837,085 | Van Gelder | Dec. 15, 1931 |
| 1,900,202 | Scott | Mar. 7, 1933 |
| 2,279,751 | Hensley | Apr. 14, 1942 |
| 2,513,149 | Coutant et al. | June 27, 1950 |
| 2,593,274 | Dandurand | Apr. 15, 1952 |

FOREIGN PATENTS

| 18,472 | Great Britain | of 1910 |